(12) United States Patent
Li et al.

(10) Patent No.: US 11,025,124 B2
(45) Date of Patent: Jun. 1, 2021

(54) MOTOR AND BLOWER USING THE MOTOR

(71) Applicant: Johnson Electric S.A., Murten (CH)

(72) Inventors: Yue Li, Hong Kong (CN); Maoxiong Jiang, Shen Zhen (CN); Yingsong Ye, Shen Zhen (CN); Haijun Hua, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 346 days.

(21) Appl. No.: 16/024,645

(22) Filed: Jun. 29, 2018

(65) Prior Publication Data
US 2019/0006907 A1 Jan. 3, 2019

(30) Foreign Application Priority Data

Jun. 30, 2017 (CN) .......................... 201710526274.8

(51) Int. Cl.
H02K 5/10 (2006.01)
F04D 13/06 (2006.01)
H02K 9/02 (2006.01)
H02K 9/22 (2006.01)
H02K 9/06 (2006.01)
H02K 11/33 (2016.01)
F04D 25/06 (2006.01)

(52) U.S. Cl.
CPC ............... *H02K 5/10* (2013.01); *F04D 13/06* (2013.01); *F04D 25/06* (2013.01); *H02K 9/02* (2013.01); *H02K 9/06* (2013.01); *H02K 9/22* (2013.01); *H02K 11/33* (2016.01)

(58) Field of Classification Search
CPC . H02K 5/10; H02K 11/33; H02K 9/02; H02K 9/06; H02K 9/22; F04D 13/06; F04D 25/06
See application file for complete search history.

(56) References Cited

U.S. PATENT DOCUMENTS

| 2009/0127946 | A1* | 5/2009 | Fee .......................... H02K 5/20 310/64 |
| 2011/0175496 | A1* | 7/2011 | Shirakata .................. H02P 9/48 310/68 R |
| 2019/0191541 | A1* | 6/2019 | Falkenburger ........... H05K 5/02 |
| 2019/0226495 | A1* | 7/2019 | Kansi ....................... H02K 5/18 |

FOREIGN PATENT DOCUMENTS

| CN | 204231114 U | 3/2015 |
| CN | 205406577 U | 7/2016 |

* cited by examiner

*Primary Examiner* — Jue Zhang
(74) *Attorney, Agent, or Firm* — Millman IP Inc.

(57) ABSTRACT

A motor includes a mounting bracket; a stator mounted to one of opposite sides of the mounting bracket; a rotor is rotatably supported on the stator; and a control unit the other of the opposite sides of the mounting bracket away from the stator. The control unit includes a plate-shaped heat dissipating member fixed to the mounting to the mounting bracket, and a circuit board attached to a side of the heat dissipating member away from the mounting bracket. A seal is formed between a periphery of the heat dissipating member and the mounting bracket.

10 Claims, 10 Drawing Sheets

MOTOR AND BLOWER USING THE MOTOR

CROSS REFERENCE TO RELATED APPLICATIONS

This non-provisional patent application claims priority under 35 U.S.C. § 119(a) from Patent Application No. 201710526274.8 filed in The People's Republic of China on Jun. 30, 2017.

FIELD OF THE DISCLOSURE

The present disclosure relates to a motor, a motor having water sealing structure and a blower using the motor.

BACKGROUND OF THE DISCLOSURE

Blowers used in air conditioner systems of vehicles include a motor which is equipped with a control unit for power supply or speed adjustment of the motor. Traditionally, the control unit should be separate from the stator of the motor with water-proof materials, since there will be water vapor or condensate water during operation of the blower. The specific water-proof will increase the volume and cost of the blower, as well as be harmful to heat dissipation of the control unit.

SUMMARY OF THE DISCLOSURE

One aspect of the present disclosure provides a motor including a mounting bracket; a stator mounted to one of the opposite sides of the mounting bracket; a rotor is rotatably supported on the stator; and a control unit on the other of the opposite sides of the mounting bracket away from the stator. The control unit includes a plate-shaped heat dissipating member fixed to the mounting bracket, and a member circuit board attached to a side of the heat dissipating member away from the mounting bracket. A seal is formed between a periphery of the heat dissipating member and the mounting bracket.

Preferably, the periphery of the heat dissipating member is bent to form a flange, the mounting bracket defines a groove corresponding to the flange of the heat dissipation member, the flange is engaged into the groove of the mounting bracket.

Preferably, the groove is filled with the glue for adhesion and sealing.

Preferably, the control unit further comprises a cover mounted to the heat dissipating member, wherein the cover body and the heat dissipating member cooperatively form an accommodating space for accommodating the circuit board.

Preferably, an airflow passage is defined in the mounting bracket adjacent to the heat dissipating member.

Preferably, the mounting bracket further defines at least one air inlet and at least one air outlet in communication with the airflow passage, and adjacent to opposite ends of the heat dissipating member.

Preferably, the mounting bracket further defines a recess portion for accommodating the stator therein.

Preferably, the stator is fixed to the mounting bracket with a plurality of fasteners.

Preferably, the plurality of dampers are disposed between the fasteners and the stator, and between the stator and the mounting bracket.

Another aspect of the present disclosure provides a blower including a motor described above and an impeller fixed to the rotor of the motor.

Below, embodiments of the present disclosure will be described in detail with reference to the accompanying drawings.

DETAILED DESCRIPTION OF THE PREFERRED EMBODIMENTS

Figure 1:
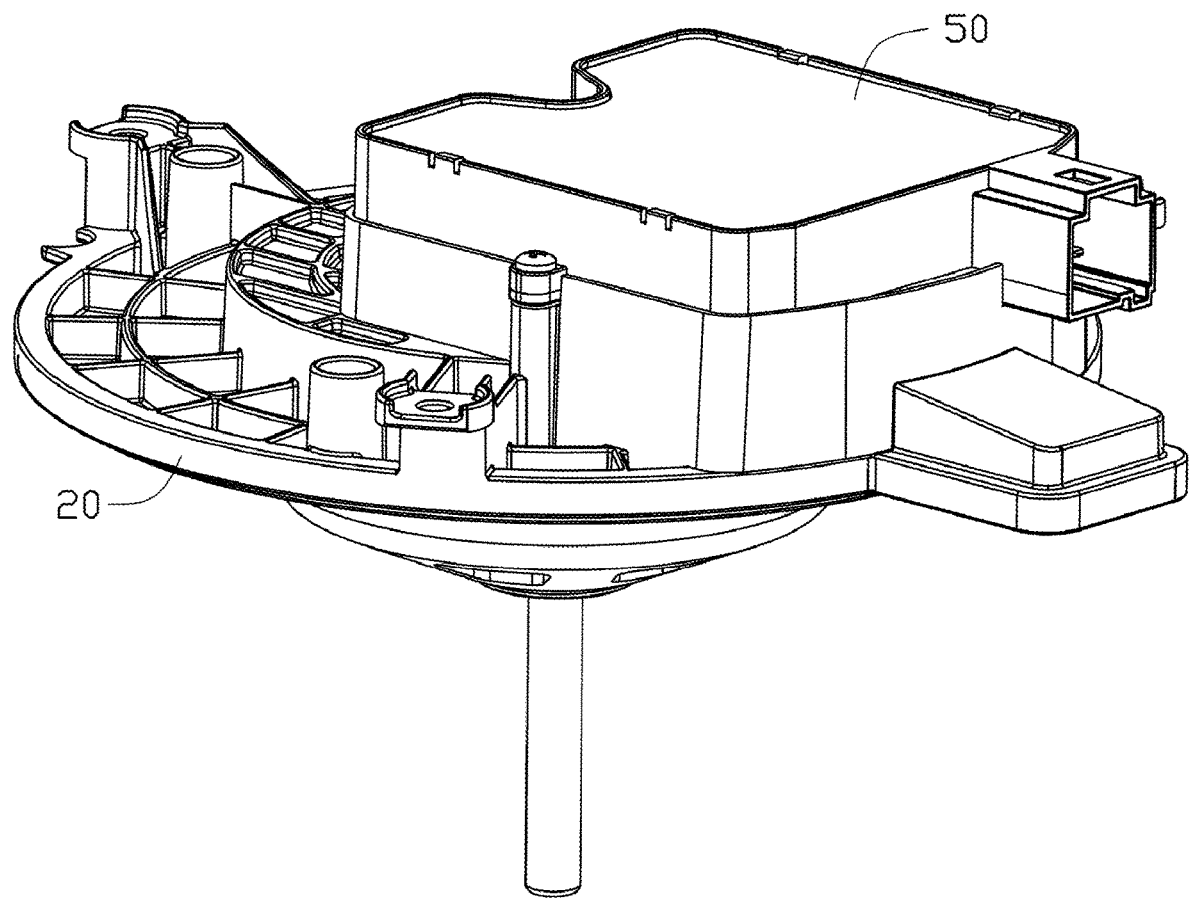
FIG. 1 is a schematic perspective view of a motor according to an embodiment of the present disclosure.
Figure 2:
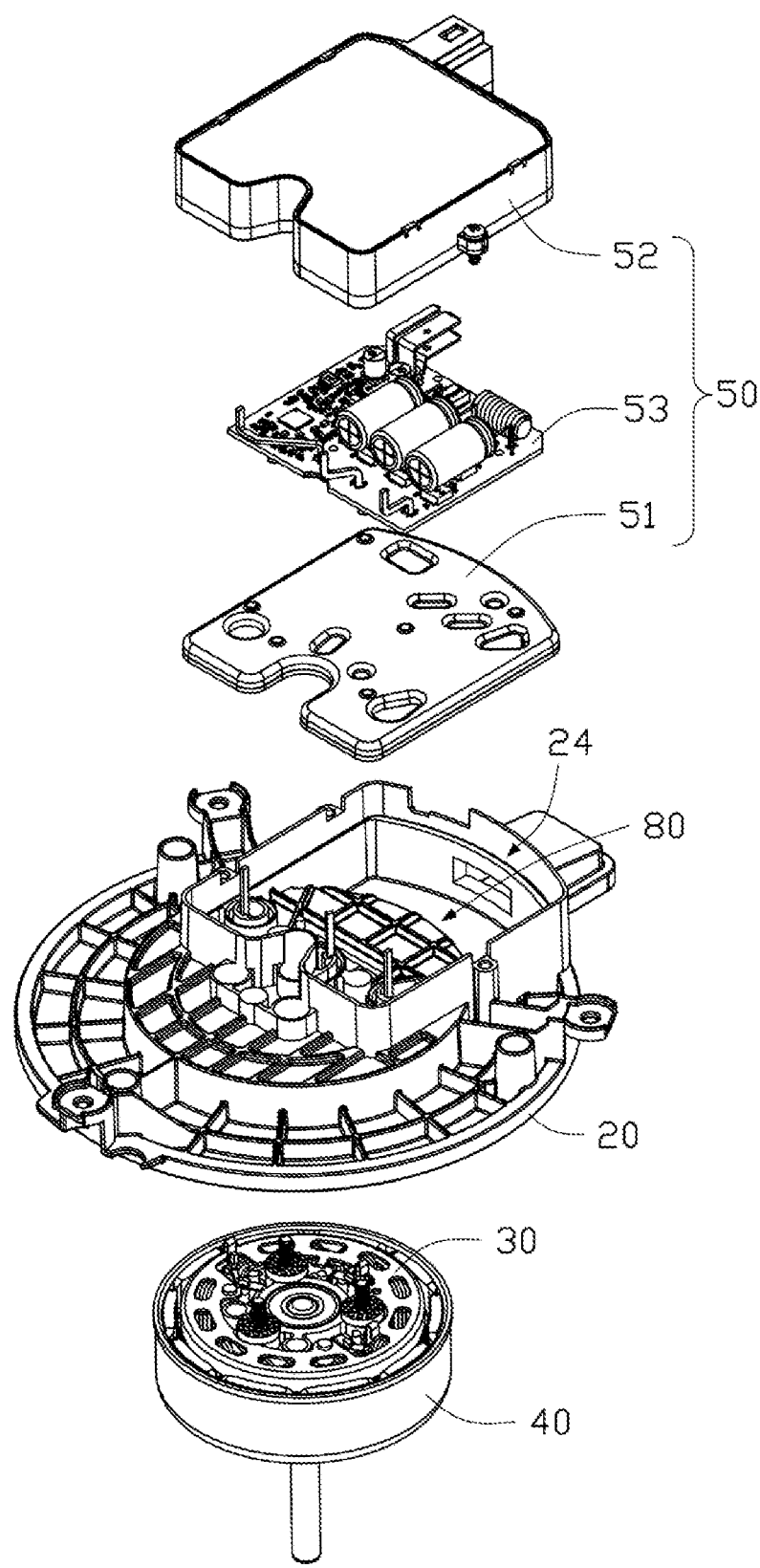
FIG. 2 is an exploded perspective view of the motor shown in FIG. 1.

Referring to FIGS. 1-2, a motor 200 in an embodiment of the present disclosure includes a mounting bracket 20, a stator 30, a rotor 40, and a control unit 50.

Specifically, in the illustrated embodiment, the motor 200 is an outer rotor motor. The rotor 40 is rotatably supported on the stator 30. The stator 30 and the control unit 50 are mounted to the mounting bracket 20, arranged at opposite sides of the mounting bracket 20. It can be understood that in other embodiments, the motor 200 may be an inner rotor motor.

Figure 3:
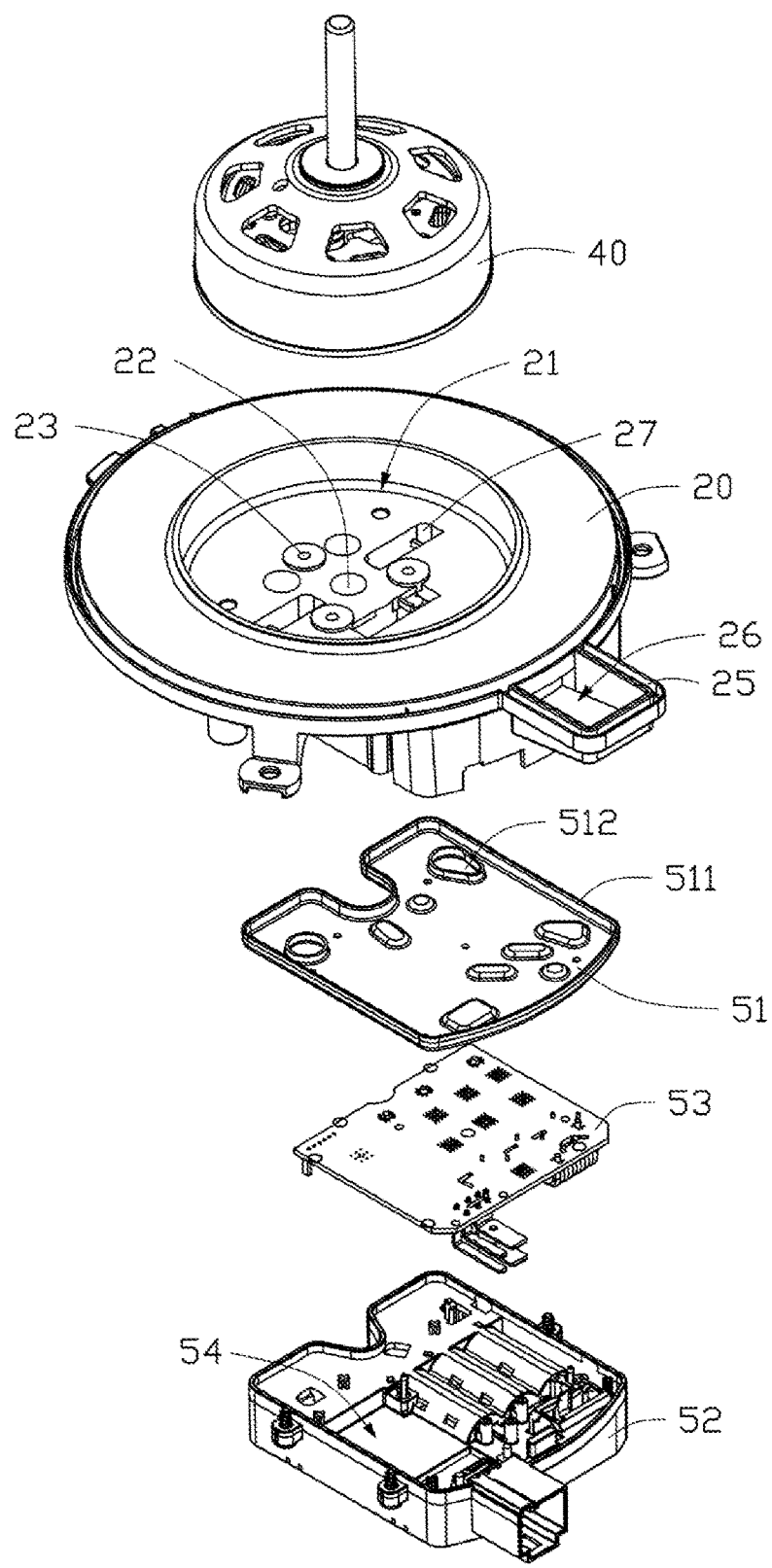
FIG. 3 is another perspective exploded view of the motor shown in FIG. 1.

Referring to FIG. 3, in the present embodiment, a recess portion 21 is provided at one of the opposite sides of the mounting bracket 20. A bottom of the recess portion 21 defines a through hole 22, which is at a center of a bottom of the recess portion 21, and a plurality of fixing holes 23 distributed around the through hole 22. The stator 30 (FIG. 2) is accommodated in the recess portion 21. It can be understood that in other embodiments, the recess portion 21 may not be provided on the mounting bracket 20, and the stator 30 may be seated on the mounting bracket 20.

Figure 4:
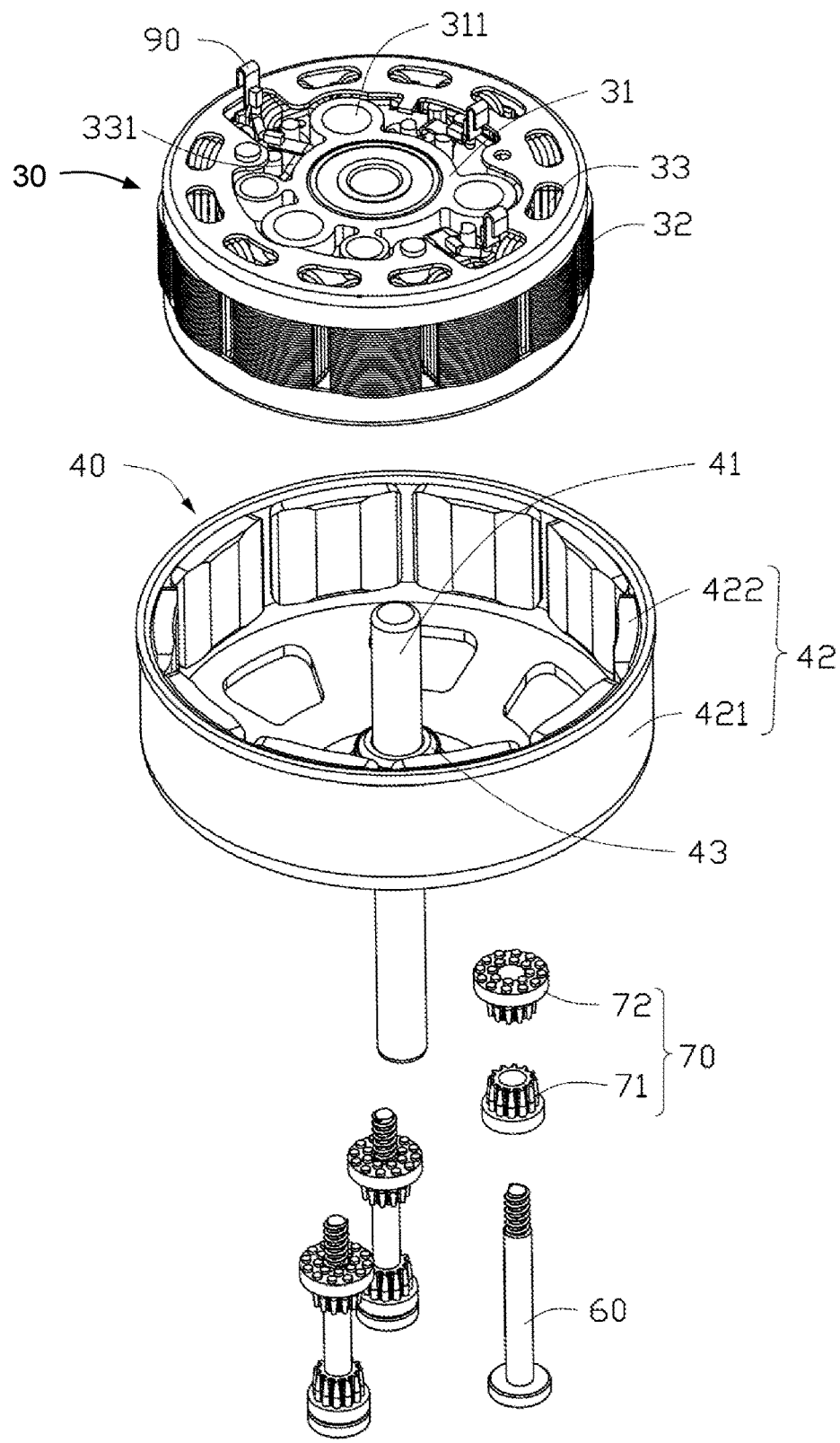
FIG. 4 is an exploded perspective view of a stator and a rotor of the motor shown in FIG. 1.

Referring to FIG. 4, in the present embodiment, the stator 30 includes a support 31, a stator core 32 mounted on the support 31, a plurality of windings 33 winding around the stator core 32 for producing an electromagnetic field to drive the rotor 40 to rotate when being energized. The support 31 defines a plurality of fastening holes 311 extending through the support 31 in the axial direction of the stator 30, and respectively in alignment with the mounting holes 23 of the mounting bracket 20 (FIG. 2).

In the present embodiment, the stator 30 is fixed to the mounting bracket 20 by a plurality of fasteners 60. Specifically, in the present embodiment, the fasteners 60 respectively pass through the fastening holes 311 of the stator 30 and the corresponding fixing holes 23 of the mounting bracket 20 to fix the stator 30 to the mounting bracket 20.

In the present embodiment, a plurality of dampers 70 are further provided between the stator 30 and the mounting bracket 20. The dampers 70 may be vibration-absorbing elements made of rubber, foam, resin, plastic, or the like. It can also be an elastic iron piece or spring. The dampers 70 can reduce the noise generated by the stator 30 and the rotor 40 during operation of the motor 200, which would be transferred to the mounting bracket 20, so that the overall noise of the motor 200 is reduced. Specifically, in the present embodiment, the dampers 70 are respectively accommodated in the fastening holes 311 to isolate the fastener 60 from the stator 30, and isolate the stator 30 from the mounting bracket 20. The damper 70 includes a first damper body 71 and a second damper body 72 that are separately disposed and are the same structure as each other. The first damping body 71 is sandwiched between the stator 30 and the fastener 60. The second damping body 72 is sandwiched between the stator 30, and the fastener 60, and between the fastener 60, and the mounting bracket 20. Since the dampers 70 and the stator 30 contact with each other over a small area, and the fasteners 60 is prevented from directly contacting the stator 30, the shock generated by the stator 30 and rotor 40 during operation of the motor 200 cannot directly transmit to the mounting bracket 20, and most of the shock is absorbed by the dampers 70.

Referring to FIGS. 1 to 3, in the present embodiment, the control unit 50 includes a heat dissipating member 51, a cover 52, and a circuit board 53. The cover 52 and the heat dissipating member 51 cooperatively form an accommodating space 54 accommodating the circuit board 53. Specifically, in the present embodiment, the heat dissipating member 51 is a substantially plate-shaped member attached to a side of the mounting bracket 20 facing away from the stator 30. The periphery of the heat dissipating member 51 is provided with a glue or the like for adhering heat dissipating member 51 to the mounting bracket 20, and to form a seal between the periphery of the heat dissipating member 51 and the mounting bracket 20, thereby preventing the water or the water vapor probably existing at the side of the mounting bracket 20 with the stator 30 from entering the control unit 50. An airflow passage 80 is defined in the mounting bracket 20 adjacent to the heat dissipating member 51. Therefore, the heat dissipating member 51 can be cooled by airflow in time. The circuit board 53 can be in contact with the heat dissipating member 51 through a thermally conductive insulating layer to facilitate heat dissipation.

In this embodiment, specifically, the peripheral of the heat dissipation member 51 is bent to form a flange 511. The mounting bracket 20 defines a groove 24 corresponding to the flange 511 of the heat dissipation member 51. The flange 511 is engaged into the groove 24 when the heat radiating member 51 is mounted to the mounting bracket 20. Preferably, the groove 24 is filled with a glue for adhesion and sealing.

In this embodiment, an ear portion 25 is formed on an edge of the mounting bracket 20, and an air inlet 26 is defined in the ear portion 25. The heat dissipating member 51 is adjacent to the ear portion 25 and the air inlet 26. The airflow passage 80 in the mounting bracket 20 is in communication with the air inlet 26. The bottom of the recess portion 21 of the mounting bracket 20 further defines a plurality of air outlet 27 communicating with the airflow passage 80.

Referring to FIGS. 4 to 9, in the present embodiment, three lead wires 331 of the windings 33 extend from the stator 30 through the bottom of the recess portion 21. Each of the lead wires 331 is connected to a conductive pin 28 disposed on the mounting bracket 20 through a connecting member 90. The conductive pins 28 on the mounting bracket 20 are connected to the circuit board 53. Therefore, the windings 33 are electrically connected to the circuit board 53 to receive the three-phase power form the circuit board 53. It can be understood that the number of the lead wires 331 is corresponding to the number of the phases of the motor 200. If the motor 200 is a single-phase motor, there may be two lead wires 331 of the winding 33.

The conductive pins 28 are mounted on the mounting bracket 20 by insert molding. Each of the terminals includes a first end 281 and a second end 282. The first end 281 is located in one of the air outlets 27 (FIG. 3) of the mounting bracket 20, and the second end 282 passes through the heat dissipating member 51 and is connected to the terminal 531 on the circuit board 53 by welding, snaps or other fixing means. Specifically, in the present embodiment, each of the conductive pins 28 is substantially L-shaped. The first end 281 is engaged into a sidewall bounding the corresponding one air outlet 27 of the mounting bracket 20, and the second end 282 extends towards the heat dissipating member 51. The mounting brackets 20 are further provided with a plurality of sealing members 29 tightly fitting in the air outlets 27, respectively, to prevent water vapor on the side of the stator 30 from entering the control unit 50. The heat dissipating member 51 further defines a plurality of the openings 512 respectively in alignment with the air outlets 27 with the conductive pins 28 therein. The sealing members 29 in the air outlets 27 are further tightly fitted into the corresponding openings 512 of the heat dissipating member 51. The conductive pins 28 penetrate through the corresponding sealing members 29 and then further pass through the openings 512 of the heat dissipating member 51. Glue or other sealing material is applied to the periphery of the sealing members 29 to enhance the sealing.

Each connecting member 90 includes a flexible cable 91 and two rigid conductive terminals 92 respectively fixed on opposite ends of the flexible cable 91. A rigid conductive terminal 92 is fixed by soldering or other means and electrically connected to one of the lead wires 331. Specifically, in this embodiment, the rigid conductive terminal 92 has a hook-like configuration, which enables positioning the rigid conductive terminal 92 to the lead wire 331 before the welding process, and then facilitates the welding operation.

The rigid conductive terminal 92 at the other end of the flexible cable 91 is electrically connected to one of the conductive pins 28 provided on the mounting bracket 20. Specifically, in this embodiment, the rigid conductive terminal 92 has a hook-like configuration, which enables positioning the rigid conductive terminal 92 to the conductive pin 28 before the welding process, and then facilitates the welding operation.

Figure 5:
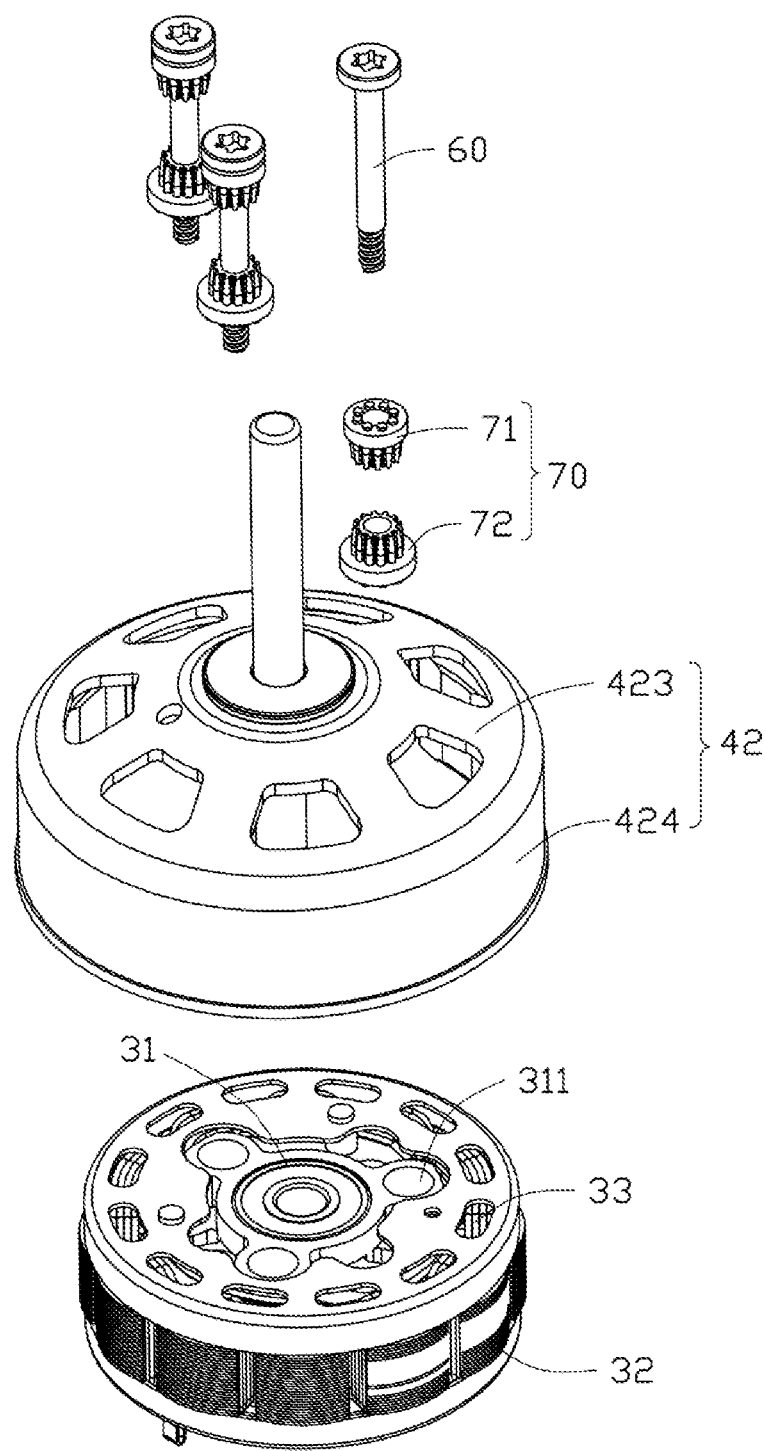
FIG. 5 is similar to FIG. 4, but shown in different perspective.
Figure 6:
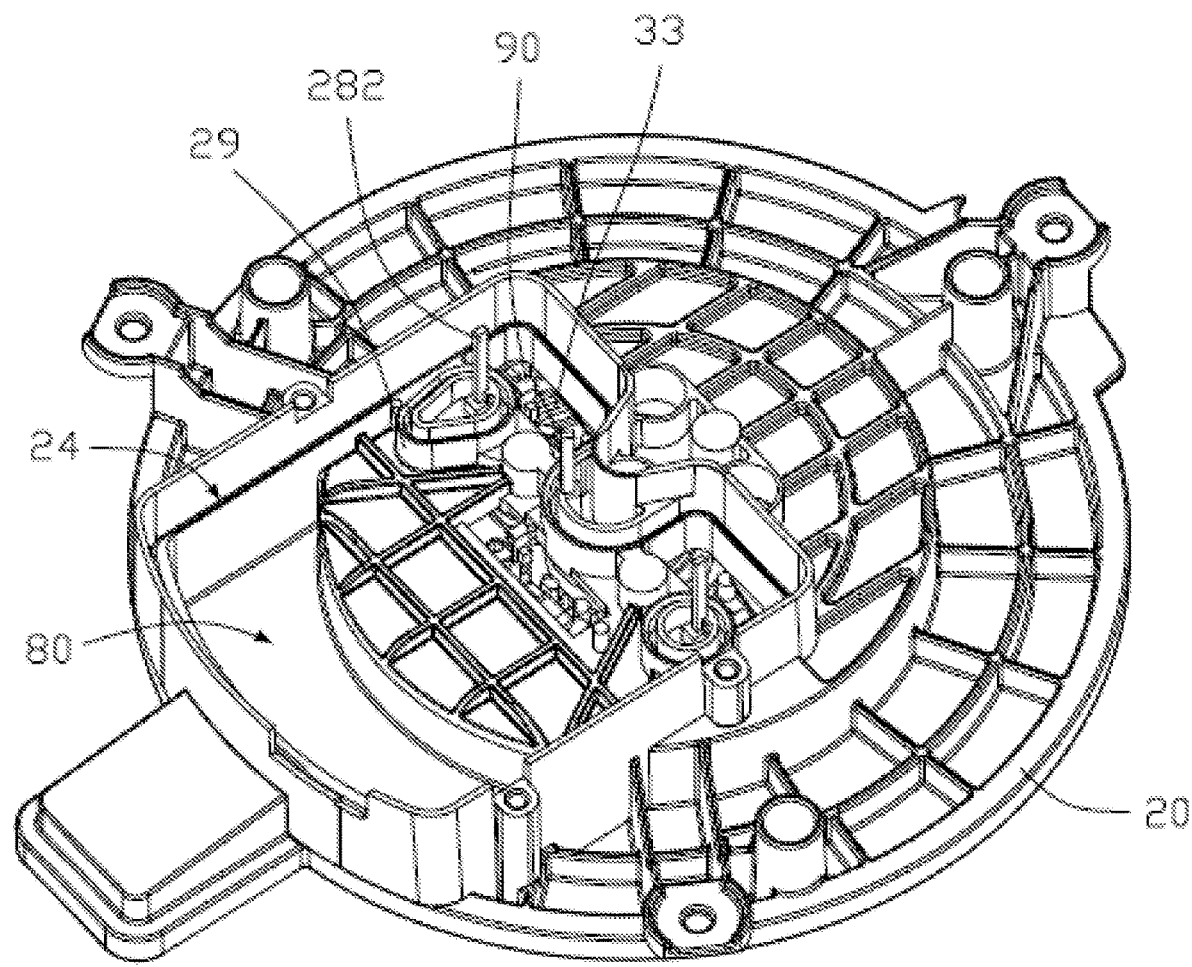
FIG. 6 is an enlarged perspective view of a mounting bracket of the motor of FIG. 1.
Figure 7:
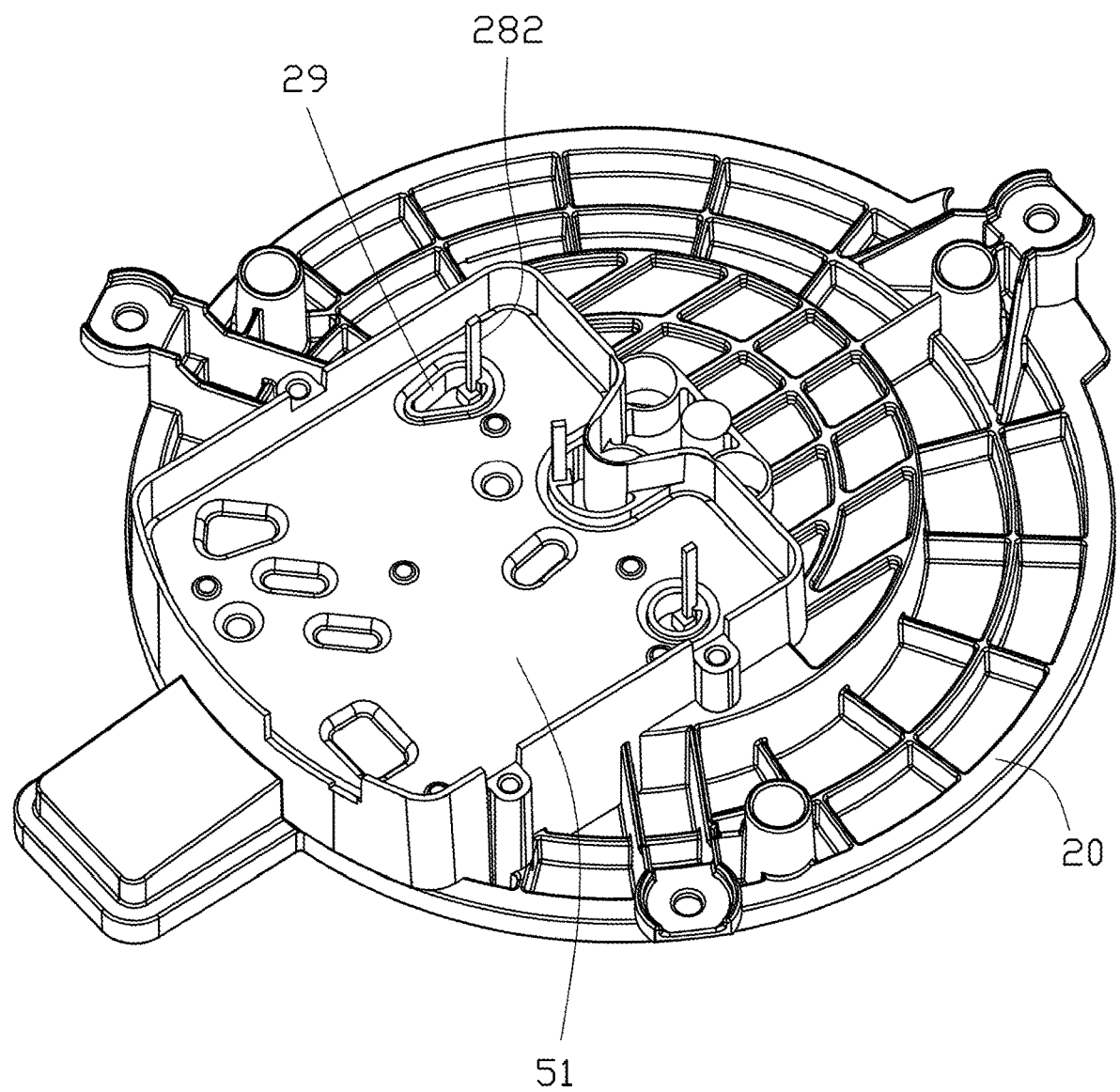
FIG. 7 is an enlarged schematic perspective view of a heat dissipating member in assembly with a mounting bracket of the motor of FIG. 1.
Figure 8:
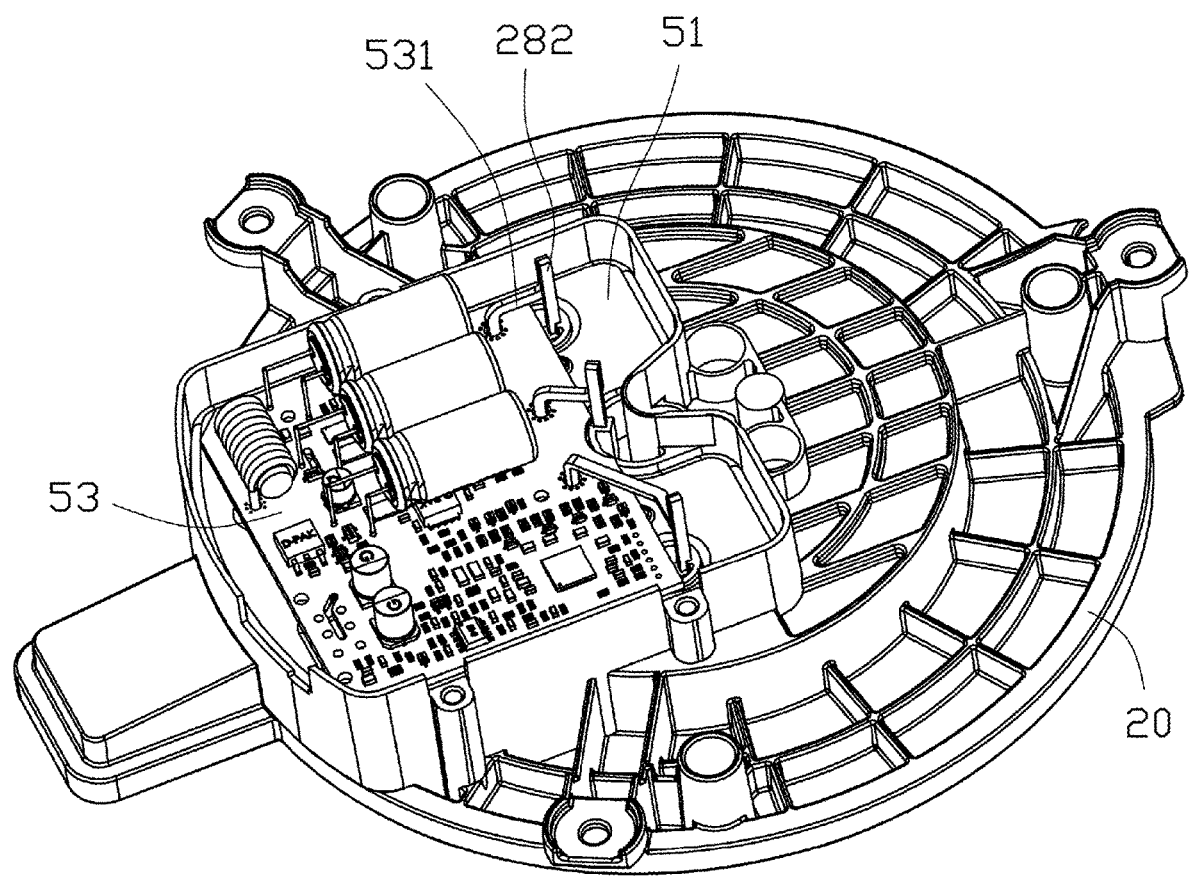
FIG. 8 an enlarged schematic perspective view of a heat dissipating member and a circuit board in assembly with a mounting bracket of the motor of FIG. 1.
Figure 9:
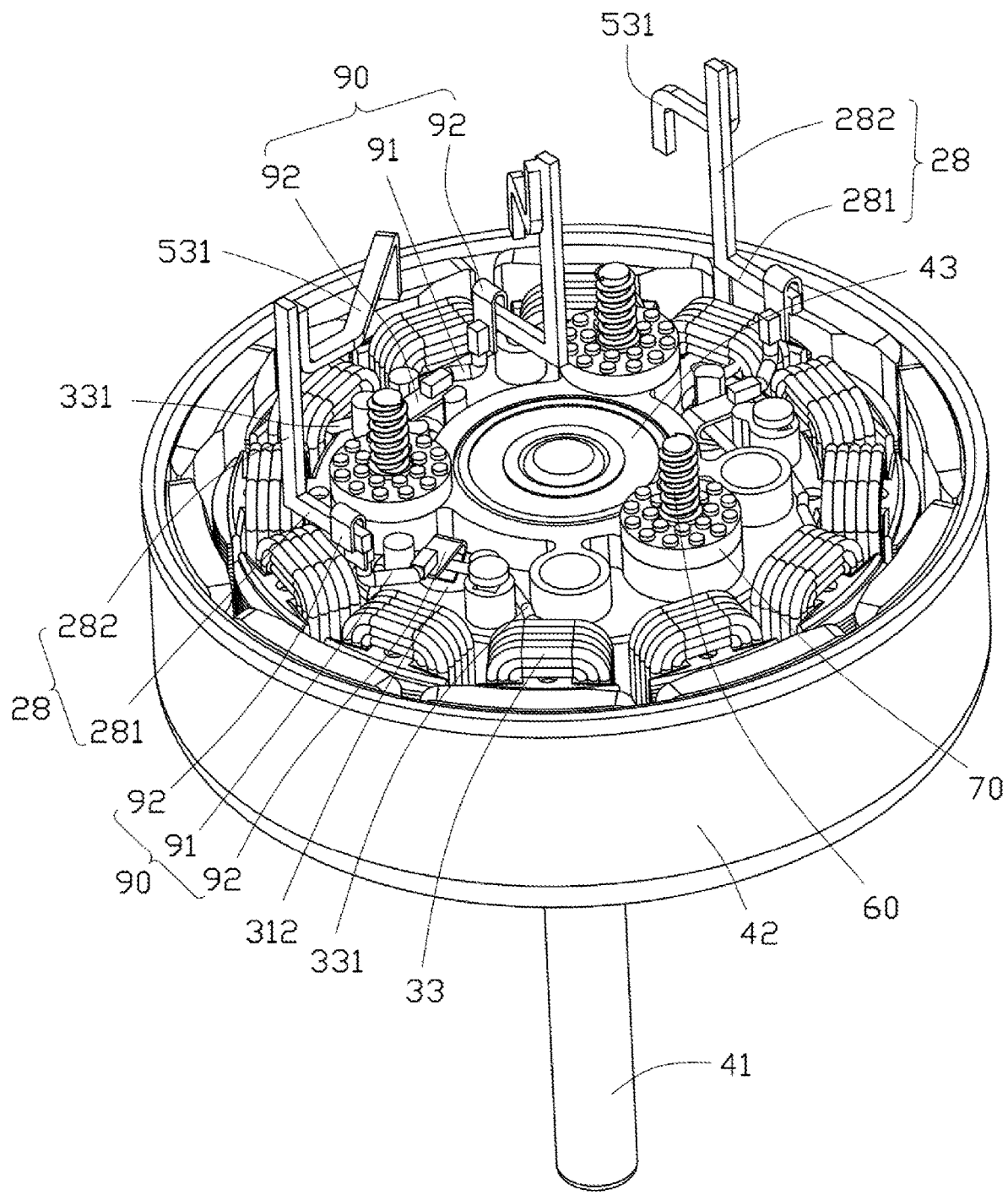
FIG. 9 is an assembled view of FIG. 4.

Referring to FIGS. 4 and 5, in the present embodiment, the rotor 40 includes a rotation shaft 41 and a rotor body 42. The rotation shaft 41 is rotatably supported on the support 32 via two bearings 43. The rotor body 42 includes a housing 421 and a plurality of magnets 422 attached to an inner surface of the housing 421. The housing 421 is fixed to the rotation shaft 41 and rotatably sleeved on the stator 30. In this embodiment, the housing 421 includes a connecting portion 423 and a cylindrical portion 424. The connecting portion 423 is substantially arch-shaped and connected to an end of the cylindrical portion 424. The rotation shaft 41 passes through and is fixed to the connecting portion 423. The stator 30 is surrounded by the cylindrical portion 424. The plurality of magnets 422 are attached to the inner wall of the cylindrical portion 424 facing the stator 30.

Figure 10:
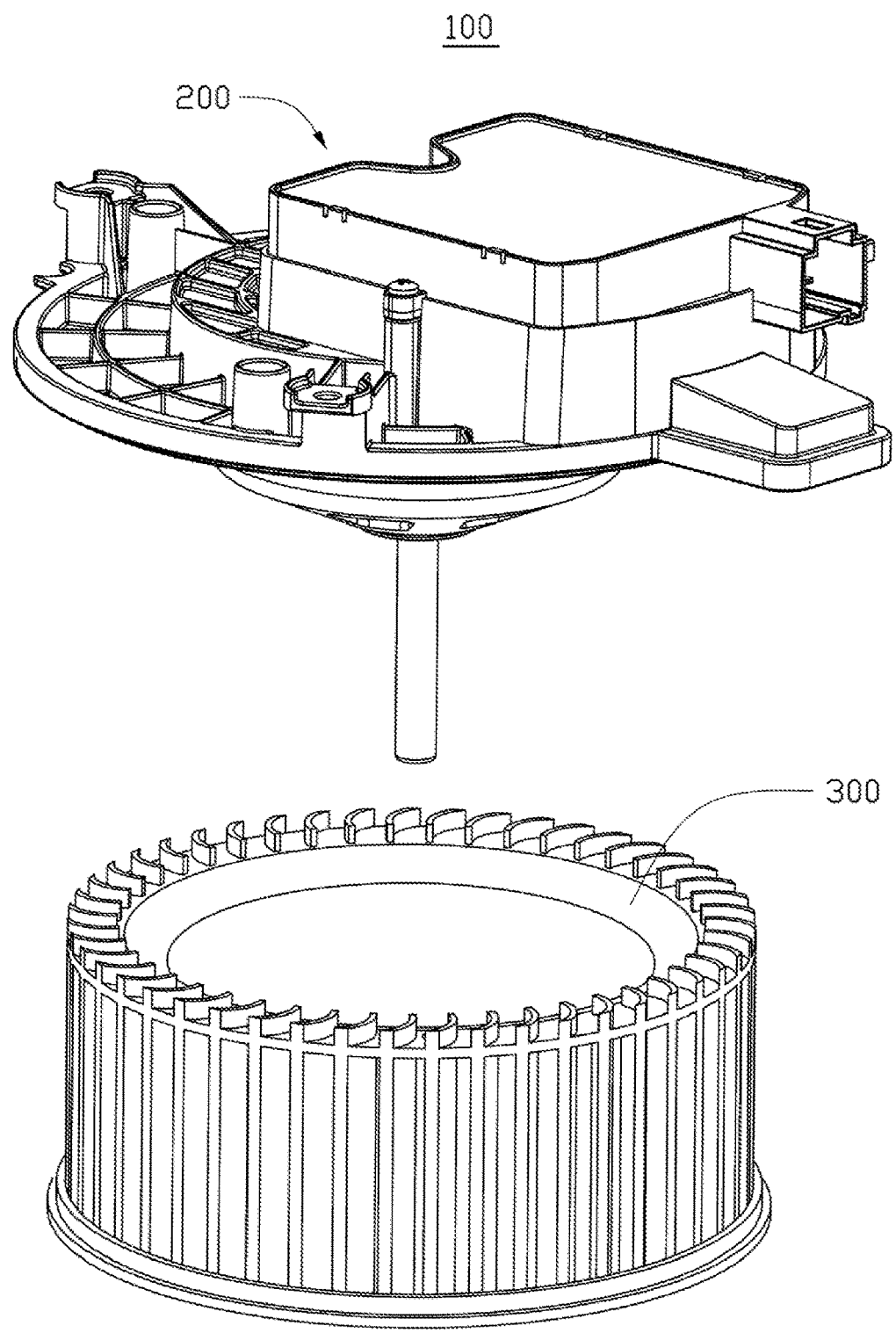
FIG. 10 is an exploded perspective view of a blower according to an embodiment of the present disclosure.

FIG. 10 shows a blower 100 using the motor 200. The blower 100 includes an impeller 300. The impeller 300 is fixed to the rotation shaft 41 (FIG. 4) and can be driven to rotate by the motor 200 to generate high pressure airflow.

Although the disclosure is described with reference to one or more embodiments, the above description of the embodiments is used only to enable people skilled in the art to practice or use the disclosure. It should be appreciated by those skilled in the art that various modifications are possible without departing from the spirit or scope of the present disclosure. The embodiments illustrated herein should not be interpreted as limits to the present disclosure, and the scope of the disclosure is to be determined by reference to the claims that follow.

The invention claimed is:

1. A motor, comprising:
   a mounting bracket;
   a stator mounted to one of opposite sides of the mounting bracket and comprising a plurality of windings;
   a rotor is rotatably supported on the stator;
   a control unit the other of the opposite sides of the mounting bracket away from the stator, the control unit comprising a plate-shaped heat dissipating member fixed to the mounting bracket, and a circuit board attached to a side of the heat dissipating member away from the mounting bracket, a seal being formed between a periphery of the heat dissipating member and the mounting bracket;
   a plurality of conductive pins electrically connecting the circuit board and the windings;
   wherein the heat dissipating member defines a plurality of the openings, the mounting bracket forms a plurality of sealing members water-tightly fit into the corresponding openings, the conductive pins penetrate through the corresponding sealing members and the further pass through the openings of the heat dissipation member.

2. The motor of claim 1, wherein the peripheral of the heat dissipation member is bent to form a flange, the mounting bracket defines a groove corresponding to the flange of the heat dissipation member, the flange is engaged into the groove of the mounting bracket.

3. The motor of claim 2, wherein a glue for adhesion and sealing is filled in the groove is filled with the glue for adhesion and sealing.

4. The motor of claim 1, wherein the control unit further comprises a cover mounted to the heat dissipating member, the cover and the heat dissipating member cooperatively form an accommodating space accommodating the circuit board.

5. The motor of claim 1, wherein an airflow passage is defined in the mounting bracket adjacent to the heat dissipating member.

6. The motor of claim 5, wherein the mounting bracket further defines at least one air inlet and at least one air outlet in communication with the airflow passage, and adjacent to opposite ends of the heat dissipating member.

7. The motor of claim 1, wherein the mounting bracket further defines a recess portion for accommodating the stator therein.

8. The motor of claim 1, wherein the stator is fixed to the mounting bracket with a plurality of fasteners.

9. The motor of claim 8, wherein the plurality of dampers is disposed between the fasteners and the stator, and between the stator and the mounting bracket.

10. A blower comprising a motor of claim 1 and an impeller fixed to the rotor of the motor.

* * * * *